United States Patent

[11] 3,572,623

| [72] | Inventor | Chester A. Lapp |
| | | 11881 Prospect Road, Cleveland, Ohio 44136 |
| [21] | Appl. No. | 848,011 |
| [22] | Filed | Aug. 6, 1969 |
| [45] | Patented | Mar. 30, 1971 |

[54] PIPE HANGER CLAMP
2 Claims, 5 Drawing Figs.

[52] U.S. Cl. ..................................................... 248/72
[51] Int. Cl. ...................................................... F16l 3/00
[50] Field of Search ........................................... 248/72, 226.1, 327

[56] References Cited
UNITED STATES PATENTS
2,388,467  11/1945  Cole ............................ 151/21X
3,321,161  5/1967  Hirt ............................. 248/72

Primary Examiner—Chancellor E. Harris
Attorney—McNenny, Farrington, Pearne and Gordon ABSTRACT: A cast iron pipe hanger clamp having a solid body with upper and lower jaws projecting from one side, and a boss projecting from the center of the opposite side and braced by upper and lower pairs of spaced flanges. The boss has a threaded bore with jam threads to receive a threaded pipe hanger rod between the spaced flanges, the load of the supported weight being distributed and loading the upper flanges in tension. A setscrew in one jaw locks the clamp in position and loads all four flanges in compression, reducing or eliminating tension load in the upper flanges.

Patented March 30, 1971 3,572,623

INVENTOR.
CHESTER A. LAPP
BY
McNENNEY, FARRINGTON, PEARNE & GORDON

ATTORNEYS

PIPE HANGER CLAMP

BACKGROUND OF THE INVENTION

The invention is an improvement in top beam pipe hanger clamps having spaced upper and lower jaws to embrace a horizontal flange of a supporting beam. Such clamps are secured in position with setscrews tightened against the underside of the flange of the beam, and have threaded openings to receive pipe hanger rods. The clamps, made of malleable iron castings, must support heavy loads but should be as small and light in weight as possible.

Prior top beam clamps include a C-clamp with both the setscrew for securing the clamp in position and the pipe hanger rod threaded into the lower jaw. In this clamp both the supported weight and the pressure of the setscrew act in the same direction on the lower jaw, so that the supported weight and any increase thereof resulting from vibration or use of the pipe act to bend the lower jaw and loosen the setscrew. At the same time the pressure of the setscrew is added to the supported load in a direction tending to break the upper jaw from the connecting body portion, thereby greatly reducing the load that can be supported by a clamp of a given size and weight. On this type of clamp it is also necessary to use lock nuts on both the setscrew and the pipe hanger rod, and the nuts are so close to each other that wrenching is difficult.

Another prior top beam clamp has the body portion connecting the upper and lower jaws enlarged and bored through to receive the pipe hanger rod. This requires an excessive increase in size and weight of the clamp in order to maintain adequate strength and stiffness in the body, and the loads are concentrated at the junction of the upper jaw and the body.

SUMMARY OF THE INVENTION

According to the present invention the body portion of the clamp is a solid section with the upper and lower spaced clamping jaws projecting from one side and with a boss projecting in the opposite direction from the center of the other side. The boss is braced by upper and lower pairs of spaced flanges integral with the body and has a threaded bore to receive the pipe hanger rod between the spaced flanges. The load of the supported weight carried by the hanger rod is distributed to the body and loads the upper pair of flanges in tension and the lower pair in compression. The setscrew threaded into the lower jaw and clamped against a support beam tends to spread the two jaws and thereby loads all of the flanges in compression counteracting the tension loading in the upper flanges. The resulting distribution of the forces avoids concentration of loads at the junction of the jaws with the body so that for a given weight and size the clamp of the present invention effectively supports a much greater load than the prior art clamps.

Another feature of the present invention is that the supported weight applied at the opposite side of the body from the jaws acts to increase the pressure of the setscrew against the supporting beam.

Another feature of the present invention is that the threads in the boss to receive the pipe hanger rod at the upper end of the bore are not tapped to the full depth of the threads on the rod, providing jam threads to lock the hanger rod against loosening, thereby eliminating the need for a jam nut on the hanger rod.

In order to provide the spaced flanges bracing the boss the clamp is cast with the mold parting line encircling the body portion in a plane perpendicular to the planes of the jaws and boss.

DESCRIPTION OF THE PREFERRED EMBODIMENT

Current building construction frequently includes the use of horizontally disposed steel I-beams for roof or ceiling support. The flanges on such I-beams are useful in supporting pipe hangers for the piping systems for the building.

Figure 1:
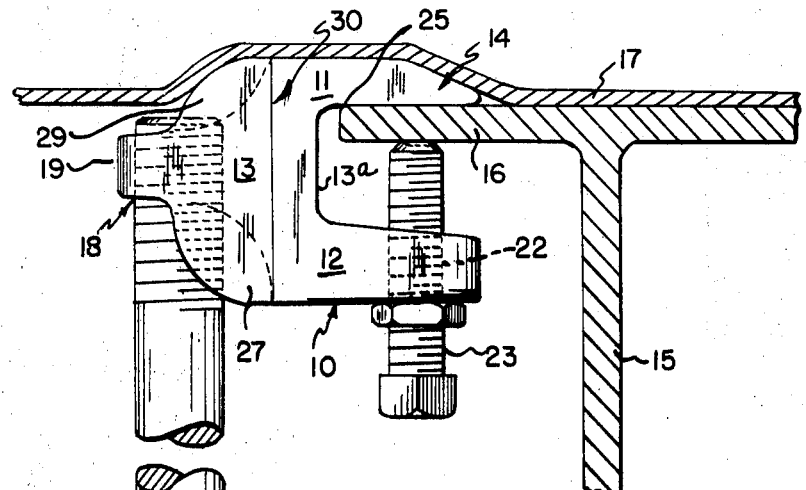
FIG. 1 is an elevation with parts in section showing a preferred embodiment of the invention assembled on an I-beam used to support a roof or ceiling.
Figure 3:
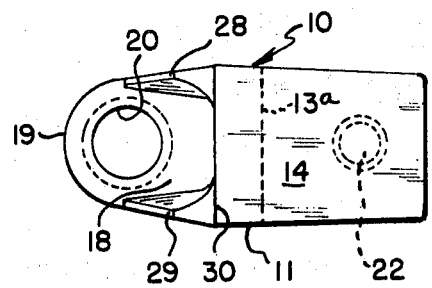
FIG. 3 is a plan view of the clamp showing flanges at each side of the threaded opening for the pipe hanger rod.
Figure 4:
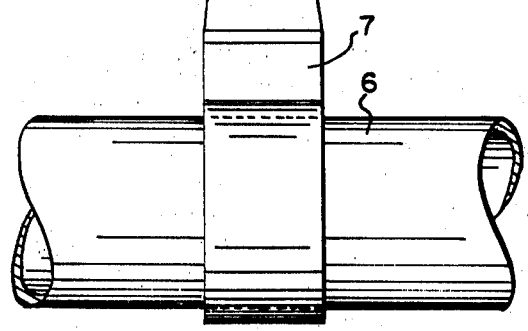
FIG. 4 is an end view of the clamp shown in FIGS. 2 and 3.
Figure 5:
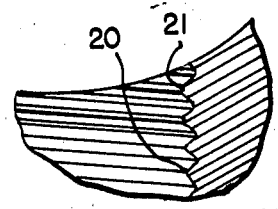
FIG. 5 is a sectional view showing the internal threaded portions which offer increased resistance to turning the pipe hanger rod beyond its optimum position.
Figure 2:
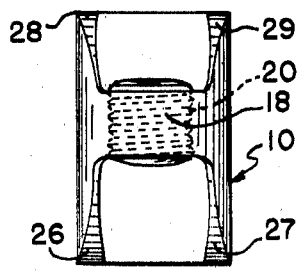
FIG. 2 is a side elevation of the clamp showing the threaded bores in phantom outline.

Referring to FIG. 1 of the drawings, the pipe 6 is shown supported by the pipe member 7 which is provided with a rotatable pipe hanger rod 8. Any suitable type of pipe supporting ring and hanger rod may be employed, the particular type forming no essential part of the present invention.

The pipe hanger clamp, indicated in its entirety at 10, has an upper jaw 11 and a lower jaw 12 and an integrally cast connecting body portion 13. The jaws 11 and 12 project from one side of the body portion 13, the face of that side being indicated at 13a. Projecting from the center of the opposite side of the body 13 is an integraly formed boss 18 having a rounded end face 19 and an internally threaded bore 20 to receive the hanger rod 8.

When the bore is threaded the threads at the top of the bore, as at 21, are not tapped to the full diameter of the threads on the hanger rod 8. Such threads, as at 21, are referred to here as jam threads. The user may determine by the increased resistance to turning of the rod 8 when the rod 8 has reached its optimum position filling the full axial height of the threads in the boss 18. The jam threads 21 eliminate the need for lock nuts on the hanger rod 8.

The supporting beam 15, as shown in FIG. 1, has an upper flange 16 to which the clamp may be applied. In the event insulating material or the like, such as 17, is supported directly against the flange 16 the upper jaw 11 of the clamp may be pushed under this material and over the flange 16. This is facilitated by the wedge nose 14 on the upper jaw 11.

The lower jaw 12 of the clamp is internally threaded as at 22 to receive the setscrew 23 which engages the underside of the flange 16 of the I-beam 15. After the clamp has been driven into the position shown in FIG. 1 by striking the rounded face 19, the setscrew 23 may be drawn up so that the cup point on the setscrew bites into the underside of the flange 16.

Cast integrally with the boss 18 and the body portion 13 are a pair of spaced lower flanges 26 and 27 and a pair of spaced upper flanges 28 and 29. The flanges are spaced sufficiently to permit the hanger rod 8 to pass between them and join the boss 18 to the body through the full height of the body on the side opposite the face 13a.

When the setscrew 23 is drawn up to engage the underside of the flange 16 with sufficient force to lock the clamp securely in position, the reaction tends to spread the jaws 11 and 12. Such spreading is resisted by the stiffness of the body 13 and by the upper and lower pairs of flanges 26, 27, 28 and 29 which are thereby loaded in compression. The suspended load transmitted to the boss 18 by the hanger rod 8 tends to deflect the boss downwardly and thus loads the lower flanges 26 and 27 in compression and the upper flanges 28 and 29 in tension. The entire clamp is formed as a malleable iron casting, which material has a compressive strength much greater than its tensile strength, and the combination of forces applied by the setscrew and by the suspended load is distributed by the flanges throughout the height of the body 13, the tension loading on the upper flanges 28 and 29 being minimized or eliminated.

The suspended load applied to the boss 18 also tends to rock the clamp about the fulcrum point 25 and thereby forces the setscrew 23 more fully against the underside of the flange 16. This prevents any loosening of the clamp from any increase in the load on the hanger rod 8 which might be caused by vibration or by the use of the suspended pipe.

It is required that both the setscrew 23 and the hanger rod 8 be locked against unthreading. In the present arrangement this requirement is met on the hanger rod 8 by the jam threads 21. A lock nut 31 is provided on the setscrew 23 to be tightened against the underside of the lower jaw 12 after the setscrew has been tightened. Manipulation of both the setscrew and the jam nut by a wrench is facilitated by the wide spacing between the setscrew and the hanger rod 8.

Since the setscrew 23 is subjected to only a small part of the load from the supported weight, a smaller setscrew may be used than the setscrews in the prior art devices. Tests show that a ⅜-inch setscrew if satisfactory for conventional sizes of hanger rod sizes such as ½inch, ⅝-inch and ¾-inch hanger rods.

In order to permit the formation of the spaced flanges 26, 27, 28 and 29 the clamp is cast with the mold parting line indicated at 30 encircling the body portion 13 at its widest and highest point in a plane perpendicular to the planes of the jaws 11 and 12 and the boss 18. Prior conventional clamps have been cast with the mold parting line extending along the centers of the upper and lower faces of the two jaws. The arrangement of the present invention minimizes the grinding required to remove flash and finish the clamp.

Although a preferred embodiment of the invention is described in detail, variations may be made within the scope of the following claims:

I claim:

1. An integral cast iron pipe hanger clamp having a body portion with spaced jaws projecting in one direction from one side thereof, one of said jaws having an opening for a setscrew to secure the clamp to a supporting beam, wherein the improvement comprises a boss projecting in the opposite direction from the center of the other side of said body portion, and upper and lower pairs of spaced flanges extending from the side of said boss to said other side of said body portion, said boss having an opening between said flanges to receive a pipe hanger rod.

2. A pipe hanger clamp as set forth in claim 1 in which the opening in said boss is internally threaded with the threads terminating in jam threads adjacent one face of said boss.